(12) United States Patent
Cheng et al.

(10) Patent No.: US 10,671,684 B2
(45) Date of Patent: Jun. 2, 2020

(54) METHOD AND APPARATUS FOR IDENTIFYING DEMAND

(71) Applicant: Baidu Online Network Technology (Beijing) Co., Ltd., Beijing (CN)

(72) Inventors: Jun Cheng, Beijing (CN); Jia Gui, Beijing (CN); Jingya Tang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 135 days.

(21) Appl. No.: 16/134,273

(22) Filed: Sep. 18, 2018

(65) Prior Publication Data
US 2019/0179966 A1  Jun. 13, 2019

(30) Foreign Application Priority Data
Nov. 29, 2017 (CN) .......................... 2017 1 1223802

(51) Int. Cl.
*G06F 16/9535* (2019.01)
*G06N 20/00* (2019.01)
(52) U.S. Cl.
CPC ......... *G06F 16/9535* (2019.01); *G06N 20/00* (2019.01)
(58) Field of Classification Search
CPC .......................... G06F 16/9535; G06N 20/00
USPC ....................................................... 707/771
See application file for complete search history.

(56) References Cited

U.S. PATENT DOCUMENTS

| | | | | |
|---|---|---|---|---|
| 2010/0262601 | A1* | 10/2010 | Dumon | G06Q 30/02 707/727 |
| 2010/0299343 | A1* | 11/2010 | Ahari | G06F 7/00 707/759 |
| 2011/0258049 | A1* | 10/2011 | Ramer | G06O 30/02 705/14.66 |
| 2012/0173373 | A1* | 7/2012 | Soroca | G06O 30/0241 705/26.3 |
| 2012/0310915 | A1* | 12/2012 | Yang | G06F 16/319 707/711 |
| 2018/0081922 | A1* | 3/2018 | Brown | G06F 16/2455 |

FOREIGN PATENT DOCUMENTS

| | | |
|---|---|---|
| CN | 102033877 A | 4/2011 |
| CN | 103186573 A | 7/2013 |
| CN | 106951503 A | 7/2017 |

* cited by examiner

*Primary Examiner* — Dung K Chau
(74) *Attorney, Agent, or Firm* — Seed IP Law Group LLP

(57) ABSTRACT

A method and apparatus for identifying a demand are provided. A specific embodiment of the method includes: acquiring a user's query sentence and access data corresponding to a search result obtained by searching the user's query sentence; querying network data corresponding to the user's query sentence in a pre-stored query sentence dictionary; identifying the target category of demand of the user's query sentence using a trained demand identification model based on the network data; counting the access data based on categories of demand, to obtain access data distribution of the user's query sentence on each of the categories of demand; and determining a demand intensity of the target category of demand of the user's query sentence based on an identification result of the target category of demand of the user's query sentence and the access data distribution. The embodiment improves the accuracy in identifying a demand.

11 Claims, 4 Drawing Sheets

METHOD AND APPARATUS FOR IDENTIFYING DEMAND

CROSS-REFERENCE TO RELATED APPLICATIONS

This application claims priority to Chinese Patent Application no. 201711223802.9, filed with the China National Intellectual Property Administration (CNIPA) on Nov. 29, 2017, the contents of which are incorporated herein by reference in their entirety.

TECHNICAL FIELD

Embodiments of the disclosure relate to the field of computer technology, specifically to the field of search technology, and more specifically to a method and apparatus for identifying a demand.

BACKGROUND

As the search technology develops, the search service is not only limited to providing a result matching a user-entered query sentence. For better satisfaction of user's search demand, the demand may be identified from the query formula of the user. By demand identification, the contents meeting the user demand may be extracted during recalling and sorting the search results, to enable the user to acquire desired information quickly.

The traditional demand identification solution depends on prior knowledge of human to exploit a related word list, and determines the user demand online based on the word list matching and the rule matching. User demand for a specific category of contents (e.g., an image, a novel, a game, and a video) is also identified using a method based on the word list matching and the rule matching.

SUMMARY

Embodiments of the disclosure present a method and apparatus for identifying a demand.

In a first aspect, an embodiment of the disclosure provides a method for identifying a demand, including: acquiring a user's query sentence and access data corresponding to a search result obtained by searching the user's query sentence; querying network data corresponding to the user's query sentence in a pre-stored query sentence dictionary, the query sentence dictionary being established based on query sentences having a target category of demand and the network data corresponding to each of the query sentences having the target category of demand; identifying the target category of demand of the user's query sentence using a trained demand identification model based on the network data corresponding to the user's query sentence; counting the access data corresponding to the search result obtained by searching the user's query sentence based on categories of demand, to obtain access data distribution of the user's query sentence on each of the categories of demand; and determining a demand intensity of the target category of demand of the user's query sentence based on an identification result of the target category of demand of the user's query sentence and the access data distribution of the user's query sentence on the each of the categories of demand.

In some embodiments, the identifying the target category of demand of the user's query sentence using a trained demand identification model based on the network data corresponding to the user's query sentence includes: extracting a characteristic from the network data corresponding to the user's query sentence; and inputting the extracted characteristic into a trained demand identification model to identify the target category of demand.

In some embodiments, the method further includes: establishing the query sentence dictionary based on historical query sentences having the target category of demand and the network data corresponding to the historical query sentences having the target category of demand, including: acquiring a user click log and a page display log corresponding to each of the historical query sentences having the target category of demand; establishing entries of the historical query sentences, performing statistical analysis on user click data and page display data based on the user click log and the page display log, and associating, in the entries of the historical query sentences, a statistical analysis result of the user click data and the page display data with the each of the query sentences; and determining site data relating to the each of the historical query sentences having the target category of demand based on the user click log and the page display log, and associating, in the entries of the historical query sentences, the site data with the each of the historical query sentences.

In some embodiments, the method further includes training the demand identification model based on marked sample query sentences, including: querying the network data corresponding to each of the sample query sentences in the pre-stored query sentence dictionary; and predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

In some embodiments, the target category of demand includes an image category of demand.

In a second aspect, an embodiment of the disclosure provides an apparatus for identifying a demand, including: an acquisition unit, for acquiring a user's query sentence and access data corresponding to a search result obtained by searching the user's query sentence; a query unit, for querying network data corresponding to the user's query sentence in a pre-stored query sentence dictionary, the query sentence dictionary being established based on query sentences having a target category of demand and the network data corresponding to each of the query sentences having the target category of demand; an identification unit, for identifying the target category of demand of the user's query sentence using a trained demand identification model based on the network data corresponding to the user's query sentence; a statistical unit, for counting the access data corresponding to the search result obtained by searching the user's query sentence based on categories of demand, to obtain access data distribution of the user's query sentence on each of the categories of demand; and a determination unit, for determining a demand intensity of the target category of demand of the user's query sentence based on an identification result of the target category of demand of the user's query sentence and the access data distribution of the user's query sentence on the each of the categories of demand.

In some embodiments, the identification unit is further used for identifying the target category of demand of the user's query sentence by following: extracting a characteristic from the network data corresponding to the user's query sentence; and inputting the extracted characteristic into a trained demand identification model to identify the target category of demand.

In some embodiments, the apparatus further includes: an establishing unit, for establishing the query sentence dictionary based on historical query sentences having the target category of demand and the network data corresponding to the historical query sentences having the target category of demand; the establishing unit used for establishing the query sentence dictionary by following: acquiring a user click log and a page display log corresponding to each of the historical query sentences having the target category of demand; establishing entries of the historical query sentences, performing statistical analysis on user click data and page display data based on the user click log and the page display log, and associating, in the entries of the historical query sentences, a statistical analysis result of the user click data and the page display data with the each of the query sentences; and determining site data relating to the each of the historical query sentences having the target category of demand based on the user click log and the page display log, and associating, in the entries of the historical query sentences, the site data with the each of the historical query sentences.

In some embodiments, the apparatus further includes: a training unit, for training the demand identification model based on marked sample query sentences; the training unit used for training the demand identification model by following: querying the network data corresponding to each of the sample query sentences in the pre-stored query sentence dictionary; and predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

In some embodiments, the target category of demand includes an image category of demand.

The method and apparatus for identifying a demand provided by the embodiments of the disclosure acquire a user's query sentence and access data corresponding to a search result obtained by searching the user's query sentence, then query network data corresponding to the user's query sentence in a pre-stored query sentence dictionary, the query sentence dictionary being established based on query sentences having a target category of demand and the network data corresponding to each of the query sentences having the target category of demand, then identify the target category of demand of the user's query sentence using a trained demand identification model based on the network data corresponding to the user's query sentence, then count the access data corresponding to the search result obtained by searching the user's query sentence based on categories of demand, to obtain access data distribution of the user's query sentence on each of the categories of demand, and finally determine a demand intensity of the target category of demand of the user's query sentence based on an identification result of the target category of demand of the user's query sentence and the access data distribution of the user's query sentence on the each of the categories of demand, thereby achieving identifying the target category of demand of the user's query sentence without depending on the prior knowledge of human. The method for identifying a demand has a strong generalization ability, improves the recall rate and accuracy rate of the identification, and contributes to saving human costs.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
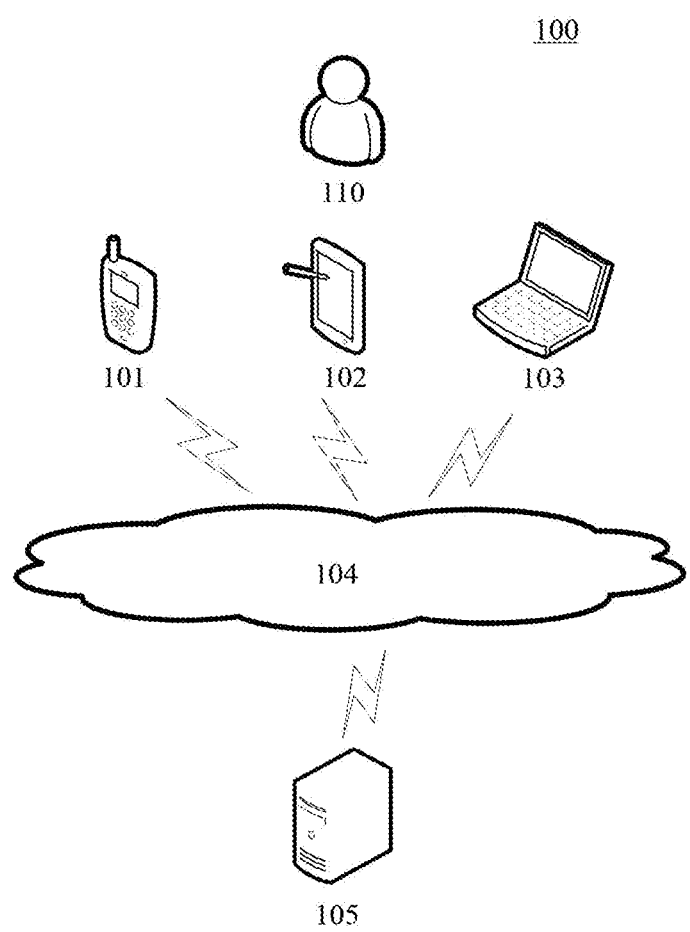
FIG. 1 is a structural diagram of an illustrative system in which the disclosure may be applied.

FIG. 1 shows an illustrative architecture of a system 100 which may be used by a method for identifying a demand or an apparatus for identifying a demand according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user 110 may use the terminal device 101, 102, or 103 to interact with the server 105 through the network 104, in order to transmit or receive messages, etc. Various applications interacting with the server 105, such as webpage browser applications, social platform applications, and mailbox clients may be installed on the terminal devices 101, 102, and 103. The terminal devices 101, 102, and 103 may be various electronic devices having a display, including but not limited to, smart phones, tablet computers, laptop computers, and desktop computers.

The server 105 may be a server providing various services, for example, aback end search engine server providing support to the search results displayed on the terminal device 101, 102 or 103. The back end search engine server may perform corresponding processing such as analyzing and querying on the search request sent by the terminal device 101, 102, or 103, and return a processing result (for example, a search result page) to the terminal device 101, 102, or 103.

It should be noted that the method for identifying a demand according to the embodiments of the present application is generally executed by the server 105. Accordingly, an apparatus for identifying a demand is generally installed on the server 105.

It should be appreciated that the numbers of the terminal devices, the networks, and the servers in FIG. 1 are merely illustrative. Any number of terminal devices, networks, and servers may be provided based on the actual requirements. For example, the server may be a cluster server, which includes a plurality of servers running different processes.

Figure 2:
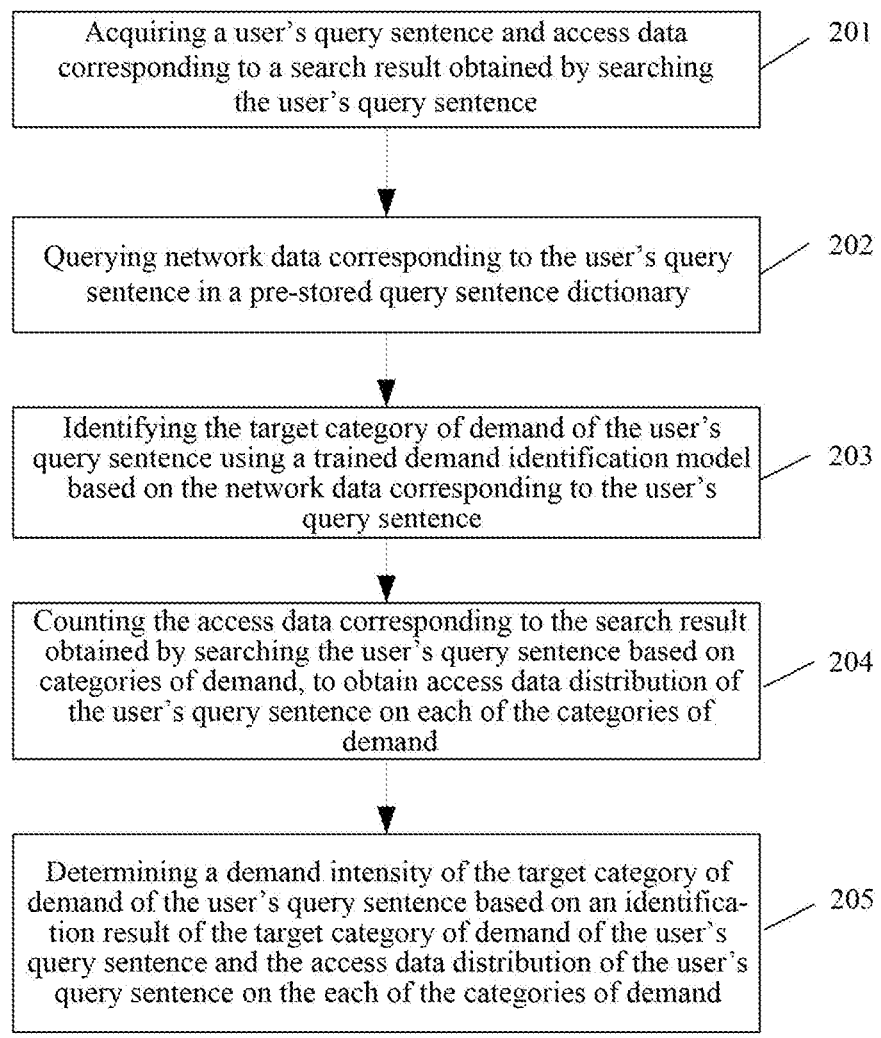
FIG. 2 is a process diagram of an embodiment of a method for identifying a demand according to the disclosure.

Further referring to FIG. 2, a process 200 of an embodiment of a method for identifying a demand according to the disclosure is shown. The method for identifying a demand includes:

Step 201: acquiring a user's query sentence and access data corresponding to a search result obtained by searching the user's query sentence.

In the embodiment, an electronic device (such as the server in FIG. 1) on which the method for identifying a demand runs may acquire a search term entered by a user, generate a user's query sentence, and then search the user's query sentence using a search engine to obtain a search result. Access data corresponding to the search result of the user's query sentence may also be acquired by querying a search log. Here, the access data may include the number of click, a proportion of the number of click on each search result to the number of click on all search results, the number of page display, a proportion of the number of page display of each search result to the number of page display of all search results, a browsing duration after clicking on to enter a page. Optionally, the access data may be the access data in a preset period, such as the access data within the last week or month.

Usually, the user may enter a search term in a search interface to initiate a search request. The electronic device may receive the search request, generate a query sentence based on the search term, and query relevant information. The electronic device may find out a plurality of search results matching the user's query sentence, and display links of the search results on the search result page. The user may click on the link to access a corresponding page. The electronic device may count the access data of the search result of the query sentence in the preset period (such as weekly or monthly), and may first acquire the counted access data of the user's query sentence when identifying a demand of the user's query sentence.

In some optional implementations of the embodiment, the access data may include, but are not limited to: at least one of the number or frequency of display, or the total number or frequency of display of each search result; or the number or frequency of click, or the total number or frequency of click of each search result. Optionally, the search engine may recommend some associated tags when providing the search results, such as recommending some query sentences having a high similarity. The user may click on the recommended tags to access relevant pages, or switch the query sentence based on the recommended tags for requery. In this case, the access data may further include at least one of the number or frequency of clicking on the recommended tags by the user, the number or frequency of switching the query sentence based on the recommended tags, the proportion of the number of switching the query sentence based on the recommended tags to the total number of click, the number of displaying of each search result after switching the query sentence based on the recommended tags by the user. Optionally, the access data may be classified, for example, classified based on a data type of a click type or a display type, classified based on data generation time, or classified based on a data source from a mobile terminal or a PC terminal.

Step 202: querying the network data corresponding to the user's query sentence in a pre-stored query sentence dictionary.

The query sentence dictionary is established based on query sentences having a target category of demand and the network data corresponding to each of the query sentences having the target category of demand.

In the embodiment, the electronic device may query the network data corresponding to the user's query sentence and acquired in the step 201 in the query sentence dictionary. Here, the network data may be electronic data in the network, including the data, such as web page contents, and user operation behaviors in the network. In some optional implementations, the network data may include the access data of the search results corresponding to the each of the user's query sentence.

Existing query sentences in the network may have different categories of demand. The category of demand may be a category of user demand indicated by the query sentence, and may indicate a demand of the user initiating a query for acquiring a category of resources. Specifically, the category of demand may include an image category, a video category, a novel category, a game category, and the like. By fitting the category of demand of the user's query sentence, a resource meeting the user demand may be more accurately screened. In the embodiment, the pre-stored query sentence dictionary may be pre-established, and may be a dictionary for storing an association relationship between query sentences have the target category and the network data associated therewith. Here, the target category is one of the categories of demand. The embodiment can identify the target category of demand of the user's query sentence. Optionally, the target category of demand includes an image category of demand.

The electronic device may collect query sentences having the target category, and acquire the network data corresponding to the query sentences, thus establishing the query dictionary. The query sentences having the target category may be acquired by identifying a keyword indicating the target category in the query sentence. For example, a query sentence "novel of Romance of the Three Kingdoms" includes a keyword "novel" indicating a novel category of demand, and an "image suitable for use as a wallpaper" includes the keyword "image" indicating an image category of demand. The query sentences having the target category may also be acquired based on statistical data of the search results in each category among the search results of the query sentence. The category including the highest number of search results or the highest-ranking search results is used as a category of demand identification result of the query sentence. For example, among the search results of the query sentence "style from Paris Fashion Week", image results account for a proportion 60%, video results account for a proportion of 25%, and other results account for a proportion of 15%. Then it may be determined that the query sentence is a query sentence having an image category of demand.

After determining the categories of demand of the query sentences, the query sentences having the target category of demand are selected to establish the query sentence dictionary. The search results of the query sentences having the target category of demand, and the click and display data of the search results may be acquired. Furthermore, the click data and display data of recommended tags corresponding to the query sentences may be collected, and a proportion of click/display data of query sentences having a keyword in the target category (for example, query sentences having an image suffix) to total click/display data, and click data and display data of different device terminal types (e.g., a mobile terminal, a personal computer terminal), and the like may also be collected. The network data and the query sentences are stored in the established dictionary correspondingly. Thus, after acquiring the user's query sentence in the step 201, the network data corresponding to the user's query sentence may be found using the established dictionary.

Step 203: identifying the target category of demand of the user's query sentence using a trained demand identification model based on the network data corresponding to the user's query sentence.

Then, the network data corresponding to the user's query sentence found in the step 202 may be inputted into a trained demand identification model, to identify the demand of the user's query sentence using the demand identification model. Specifically, the trained demand identification model may be a model for identifying a demand intensity of the target category of demand of the user's query sentence, or a model for identifying whether the user's query sentence includes the target category of demand. The demand identification model may be a model for identifying the target category of demand obtained by training using a machine learning method, such as a random forest, a support vector machine, logistic regression, or a neural network, based on sample training data. After inputting the network data found in the step 202 into the demand identification model, an identification result of the target category of demand of the user's query sentence may be obtained.

Step 204: counting the access data corresponding to the search result obtained by searching the user's query sentence based on categories of demand, to obtain access data distribution of the user's query sentence on each of the categories of demand.

In the embodiment, the access data corresponding to the search result obtained by searching the user's query sentence acquired in the step 201 may be counted based on the category of demand, i.e., counting the access data corresponding to each of the categories of demand, to obtain access data distribution of the user's query sentence on each of the categories of demand.

Specifically, the category of demand corresponding to the access data may be determined based on the category of the network resources generating the access data. For example, when image click data correspond to the click data generated by searching the user's query sentence and accessing image resources, the image click data correspond to the image category of demand. Thus, the access data may be classified and collected based on the category of the network resources for the access data, and the access data in each category are collected, to obtain the access data distribution on categories. Here, the specific access data distribution may be a proportion of the access data corresponding to each of the categories of demand to all access data.

Step 205: determining a demand intensity of the target category of demand of the user's query sentence based on an identification result of the target category of demand of the user's query sentence and the access data distribution of the user's query sentence on the each of the categories of demand.

A demand intensity of the target category of demand of the user's query sentence may be determined based on an identification result in the step 203 and the statistical result of the access data distribution in the step 204. The demand identification result obtained by the demand identification model may include an intensity level of the target category of demand. The intensity level denotes an intensity degree of the target category of demand of the user's query sentence, or a possibility level of the target category of demand of the user's query sentence. The proportion of access data in the target category to the total access data may be concluded from the access data distribution. The demand intensity of the target category of demand of the user's query sentence may be obtained by calculating a weighted sum of the demand identification result obtained using the demand identification model and a proportion of the access data in the target category determined based on the access data distribution, or multiplying the demand identification result by the proportion of the access data in the target category.

The method for identifying a demand according to the above embodiments of the disclosure acquires a user's query sentence and access data corresponding to a search result obtained by searching the user's query sentence, then queries network data corresponding to the user's query sentence in a pre-stored query sentence dictionary, the query sentence dictionary being established based on query sentences having a target category of demand and the network data corresponding to each of the query sentences having the target category of demand, then identifies the target category of demand of the user's query sentence using a trained demand identification model based on the network data corresponding to the user's query sentence, then counts the access data corresponding to the search result obtained by searching the user's query sentence based on categories of demand, to obtain access data distribution of the user's query sentence on each of the categories of demand, and finally determines a demand intensity of the target category of demand of the user's query sentence based on an identification result of the target category of demand of the user's query sentence and the access data distribution of the user's query sentence on the each of the categories of demand, thereby achieving identifying the target category of demand of the user's query sentence without depending on the prior knowledge of human. The method for identifying a demand has a strong generalization ability, improves the recall rate and accuracy rate of identification, and contributes to saving human costs.

Figure 3:
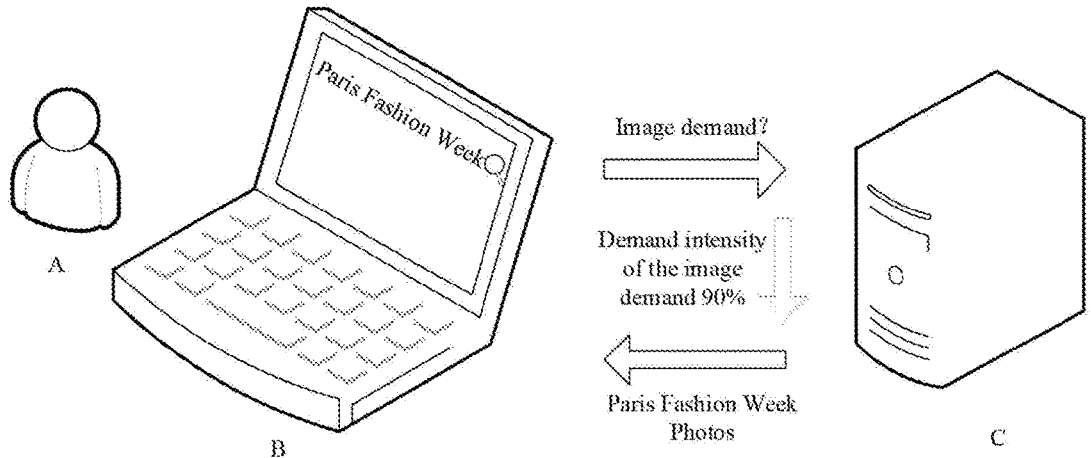
FIG. 3 is a schematic diagram of an application scenario of a method for identifying a demand according to the disclosure.

Please refer to FIG. 3, which shows a schematic diagram of an application scenario of a method for identifying a demand according to an embodiment of the disclosure. As shown in FIG. 3, a user A inputs a user query formula "Paris Fashion Week" on a search page of a terminal device B, and the terminal device B sends the user query formula to a server C. The server C may identify an image category of demand of the user query formula, and specifically may identify the demand intensity of the image category of demand of the user query formula using the demand identification method described in FIG. 2. The identification result is that the demand intensity of the image category of demand is 90%. The server C may increase weights of image search results when sorting the search results, and return the search results including the "Paris Fashion Week Photos" to the terminal device B.

In some embodiments, the step 203 of identifying the target category of demand of the user's query sentence using a trained demand identification model based on the network data corresponding to the user's query sentence includes: extracting a characteristic from the network data corresponding to the user's query sentence; and inputting the extracted characteristic into a trained demand identification model to identify the target category of demand. Specifically, the network data may be screened and filtered to remove some incredible data. A time characteristic (for example, time-varying characteristic) of the click data and the display data, a site type characteristic, a content characteristic, and the like may be extracted. Then the characteristics are integrated, and inputted into the demand identification model for identification. Optionally, the integrated characteristics may be processed by dimension reduction using a dimension reduction method, to accelerate the identification speed. Optionally, the network data characteristics may also be extracted using a common characteristic extraction model. For example, the queried network data may also be processed using a model, such as a support vector machine, or a neural network, to obtain the network data characteristics expressed as a vector or other data forms.

In some embodiments, the demand identification method may further include establishing the query sentence dictionary based on historical query sentences having the target category of demand and the network data corresponding to the historical query sentences having the target category of demand. The establishing the query sentence dictionary includes: acquiring a user click log and a page display log corresponding to each of the historical query sentences having the target category of demand; establishing entries of the historical query sentences, performing statistical analysis on user click data and page display data based on the user click log and the page display log, and associating, in the entries of the historical query sentences, a statistical analysis result of the user click data and the page display data with the each of the query sentences; and determining site data relating to the each of the historical query sentences having the target category of demand based on the user click log and the page display log, and associating, in the entries of the historical query sentences, the site data with the each of the historical query sentences.

Specifically, a user click log and a page display log corresponding to each of the historical query sentences having the target category of demand may be first extracted from a saved weblog, and then data mining may be performed on the user click log and the page display log, to collect the number of click on the provided search results, the number of users clicking on the search results, the number of display of the pages or sites indicated by the search results, the number of clicking on recommended tags by the users, the number of display of pages or sites displayed after the users clicking on the recommended tags, the number of click and display of the search results of the query sentence having a keyword in the target category, and the like in each period. A statistical analysis result of the user click data and a statistical analysis result of the page display data are obtained through statistical analysis on the user click log and the page display log, and the statistical analysis results are associated with the corresponding historical query sentences in the established entries of the historical query sentences.

At the same time, relevant characteristic data of sites clicked by the users or displayed may be determined based on the user click log and the page display log. The relevant characteristic data of sites include a type, a title, an abstract, contents, and the like of the sites, and may also include other operation data of the users in the sites, such as the operation data of adding the sites to favorites or saving site contents by the users, and the operation data of clicking links in the sites. Then the relevant characteristic data of sites are associated with the corresponding historical query sentences in the query sentence dictionary. Thus a dictionary including a plurality of entries of historical query sentences having the target category of demand is generated. When a user's query sentence is acquired for demand analysis, an entry of the user's query sentence may be found in the established dictionary, to find out corresponding network data.

Because the dictionary is established based on a large number of historical query sentences acquired by the search engine, and the user click log and the page display log corresponding to each of the historical query sentences, the dictionary covers comprehensive query sentences, includes abundant network data, and may provide reliable data support for identifying the demand of the user's query sentence.

In some embodiments, the method for identifying a demand may further include training the demand identification model based on marked sample query sentences. The training the demand identification model based on marked sample query sentences may include: querying the network data corresponding to each of the sample query sentences in the query sentence dictionary; and predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

Specifically, some existing query sentences may be selected as sample query sentences, and the categories of demand of the sample query sentences may be marked. Optionally, the demand intensity of each category of demand corresponding to the sample query sentences may also be marked. Then a demand identification model is established, and the categories of demand of the sample sentences are predicted using the established model. Optionally, the demand intensity of the target category of demand corresponding to each sample sentence may also be predicted using the established model, and then a marked result and a model prediction result are compared. The model parameters are adjusted using a method, such as gradient descent, based on the difference between the marked result and the prediction result. The inputting the sample query sentences into the model for prediction, and the comparing a marked result and a prediction result are repeatedly executed, until the difference between the prediction result and the marked result converges. The model thus obtained is the trained demand identification model. The generalization ability of demand identification can be improved by training the demand identification model using the marked sample query sentences.

Figure 4:
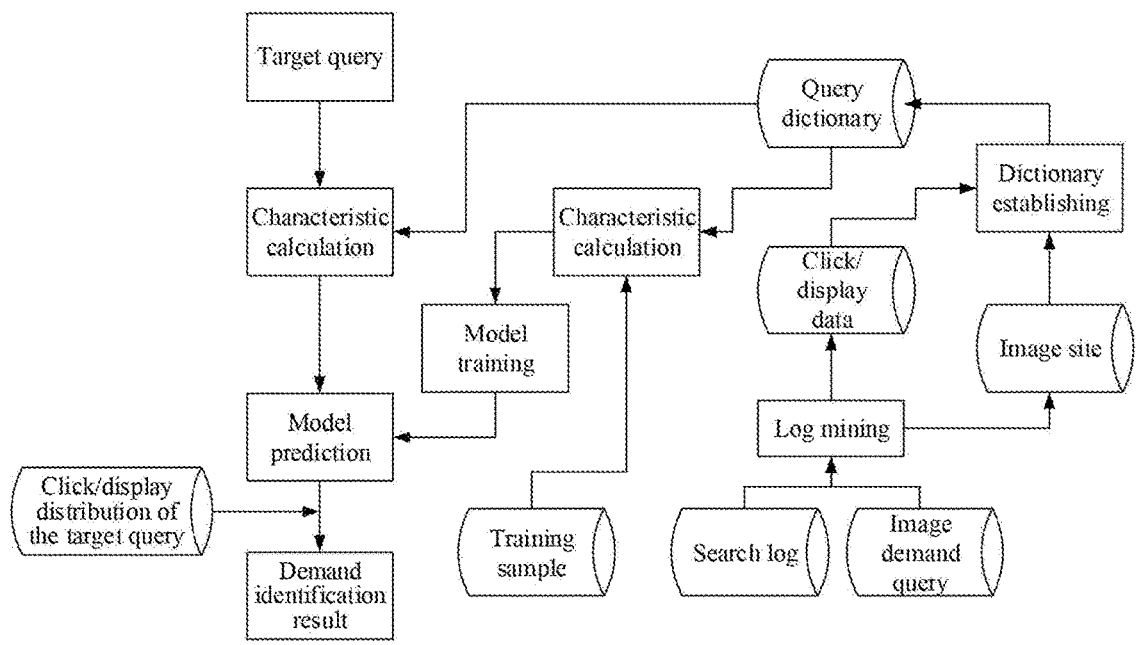
FIG. 4 is a schematic diagram of a process implementation of another embodiment of a method for identifying a demand according to the disclosure.

Please refer to FIG. 4, which shows a schematic diagram of a process implementation of another embodiment of a method for identifying a demand according to the disclosure. The target category of demand being an image category of demand is taken as an example.

As shown in FIG. 4, a log mining may be performed on a search log and an image demand query, and a dictionary is established by collecting click/display data in the search log and analyzing image sites in the search log, to obtain a query dictionary. Here, the query dictionary includes a plurality of queries, relevant click/display data, and site analysis data.

Training samples may be established, and characteristics of the training samples may be calculated using the query dictionary. Here, the characteristic calculation may include finding click/display data corresponding to a query in the training samples, and site analysis data in the query dictionary, and may also include characteristics of vectors obtained by characteristic extraction based on these found data or other data forms. Then, the demand identification model is obtained by model training using a characteristic calculation result of the training samples.

When a user-entered target query is identified, a characteristic calculation of the target query may be performed using the query dictionary. Specifically, data corresponding to the target query are found, and characteristics are extracted from the data. Then a model prediction result is obtained by prediction using the trained model, and then click/display distribution of the target query is calculated to obtain distribution of the historical search results of the target query in each category. Finally, a demand identification result is obtained based on the click/display distribution of the target query and the model prediction result.

As can be seen from FIG. 4, by establishing a query (query sentence) dictionary, a considerable amount of relevant data may be extracted from the query for training a demand identification model and identifying a demand of the target query. Since the query dictionary is generated based on search log mining in the network, the extracted data have a high reliability, thereby improving the reliability of the model training and demand identification process. At the same time, the accuracy of demand identification can be further enhanced, due to distribution characteristics of search results of the target query.

Figure 5:
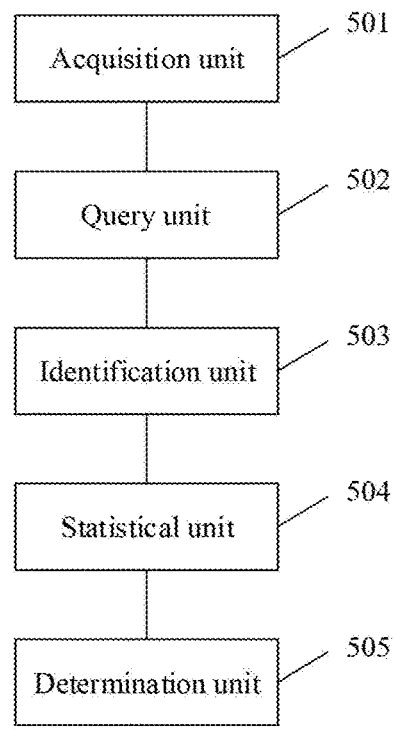
FIG. 5 is a schematic diagram of a structure of an apparatus for identifying a demand according to an embodiment of the disclosure.

Please further refer to FIG. 5. As an implementation of the method shown in the above figures, the disclosure provides an embodiment of an apparatus for identifying a demand. The embodiment of the apparatus corresponds to the embodiment of the method shown in FIG. 2. The apparatus may be specifically applied to a variety of electronic devices.

As shown in FIG. 5, the apparatus 500 for identifying a demand according to the embodiment includes: an acquisition unit 501, a query unit 502, an identification unit 503, a statistical unit 504, and a determination unit 505. The acquisition unit 501 may be used for acquiring a user's query sentence and access data corresponding to a search result obtained by searching the user's query sentence; the query unit 502 may be used for querying network data corresponding to the user's query sentence in a pre-stored query sentence dictionary, the query sentence dictionary being established based on query sentences having a target category of demand and the network data corresponding to each of the query sentences having the target category of demand; the identification unit 503 may be used for identifying the target category of demand of the user's query sentence using a trained demand identification model based on the network data corresponding to the user's query sentence; the statistical unit 504 may be used for counting the access data corresponding to the search result obtained by searching the user's query sentence based on categories of demand, to obtain access data distribution of the user's query sentence on each of the categories of demand; and the determination unit 505 may be used for determining a demand intensity of the target category of demand of the user's query sentence based on an identification result of the target category of demand of the user's query sentence and the access data distribution of the user's query sentence on the each of the categories of demand.

In the embodiment, the acquisition unit 501 may acquire a search term entered by a user, generate a user's query sentence, and then acquire access data corresponding to a search result obtained by searching the user's query sentence using a search engine, and specifically may acquire corresponding access data by analyzing a search log.

The query unit 502 may query network data corresponding to the user's query sentence acquired by the acquisition unit 501 in a query sentence dictionary. The network data may include user click data, page display data, relevant site data, and the like.

The identification unit 503 may input the network data queried by the query unit 502 into a trained demand identification model. The demand identification model may be a model for identifying whether the user's query sentence includes the target category of demand and the demand intensity of the target category of demand.

The statistical unit 504 may count the access data corresponding to the search result obtained by searching the user's query sentence and acquired by the acquisition unit 501 based on categories of demand, i.e., counting the access data corresponding to each of the categories of demand, to obtain access data distribution of the user's query sentence on each of the categories of demand.

The determination unit 505 may determine the demand intensity of the target category of demand of the user's query sentence based on an identification result obtained by the identification unit 503 and the statistical result of the access data distribution on each of the categories of demand obtained by the statistical unit 504. The demand intensity of the target category of demand of the user's query sentence may be obtained by calculating a weighted sum of the demand identification result obtained using the demand identification model and a proportion of the access data in the target category determined based on the access data distribution, or multiplying the demand identification result by the proportion of the access data in the target category.

In some embodiments, the identification unit 503 may be further used for identifying the target category of demand of the user's query sentence by following: extracting a characteristic from the network data corresponding to the user's query sentence; and inputting the extracted characteristic into a trained demand identification model to identify the target category of demand.

In some embodiments, the apparatus 500 may further include: an establishing unit, for establishing the query sentence dictionary based on historical query sentences having the target category of demand and the network data corresponding to the historical query sentences having the target category of demand. The establishing unit is used for establishing the query sentence dictionary by following: acquiring a user click log and a page display log corresponding to each of the historical query sentences having the target category of demand; establishing entries of the historical query sentences, performing statistical analysis on user click data and page display data based on the user click log and the page display log, and associating, in the entries of the historical query sentences, a statistical analysis result of the user click data and the page display data with the each of the query sentences; and determining site data relating to the each of the historical query sentences having the target category of demand based on the user click log and the page display log, and associating, in the entries of the historical query sentences, the site data with the each of the historical query sentences.

In some embodiments, the apparatus 500 may further include: a training unit, for training the demand identification model based on marked sample query sentences. The training unit may be used for training the demand identification model by following: querying the network data corresponding to each of the sample query sentences in the query sentence dictionary; and predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

In some embodiments, the target category of demand may include an image category of demand.

It should be appreciated that the units disclosed in the apparatus 500 correspond to the steps in the method described in FIG. 2. Therefore, the operations and characteristics described hereinbefore for the method also apply to the apparatus 500 and the units included therein, and are not repeated any more here.

The apparatus 500 for identifying a demand according to the above embodiments of the disclosure acquires a user's query sentence and access data corresponding to a search result obtained by searching the user's query sentence by the acquisition unit, then queries network data corresponding to the user's query sentence by the query unit in a pre-stored query sentence dictionary, the query sentence dictionary being established based on query sentences having a target category of demand and the network data corresponding to each of the query sentences having the target category of demand, then identifies the target category of demand of the user's query sentence by the identification unit using a trained demand identification model based on the network data corresponding to the user's query sentence, then counts the access data corresponding to the search result obtained by searching the user's query sentence by the statistical unit based on categories of demand, to obtain access data distribution of the user's query sentence on each of the categories of demand, and finally determines a demand intensity of the target category of demand of the user's query sentence by the determination unit based on an identification result of the target category of demand of the user's query sentence and the access data distribution of the user's query sentence on the each of the categories of demand, thereby achieving identifying the target category of demand of the user's query sentence without depending on the prior knowledge of human. The method for identifying a demand has a strong generalization ability, improves the recall rate and accuracy rate of identification, and contributes to saving human costs.

Figure 6:
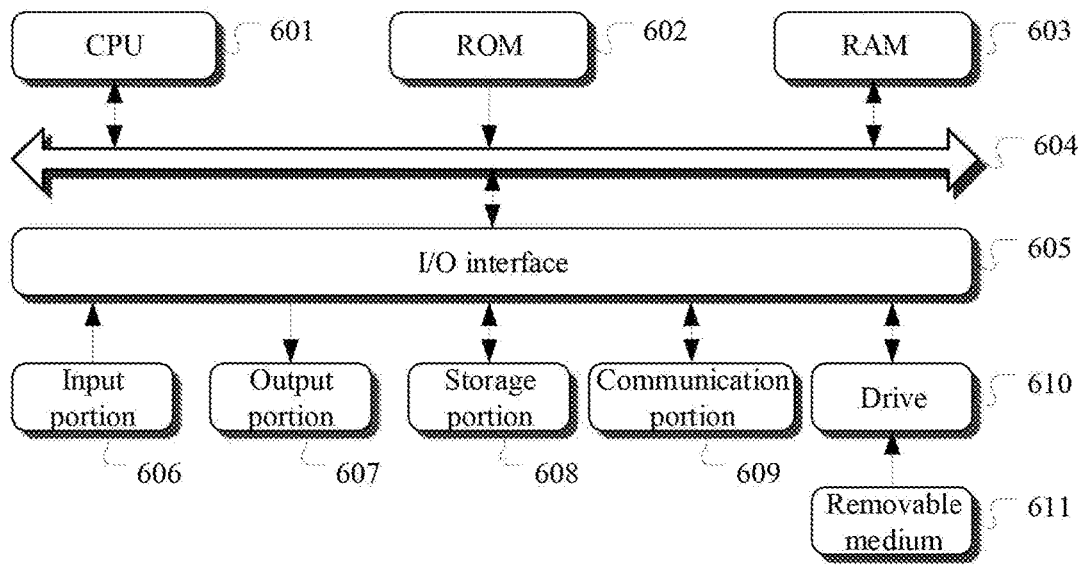
FIG. 6 is a schematic diagram of a structure of a computer system suitable for implementing a server according to an embodiment of the disclosure.

Referring to FIG. 6, a schematic structural diagram of a computer system 600 adapted to implement a server of the embodiments of the present application is shown. The server shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a query unit, an identification unit, a statistical unit, and a determination unit, where the names of these units or modules do not in some cases constitute a limitation to such units or modules themselves. For example, the acquisition unit may also be described as "a unit for acquiring a user's query sentence and access data corresponding to a search result obtained by searching the user's query sentence."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a user's query sentence and access data corresponding to a search result obtained by searching the user's query sentence; query network data corresponding to the user's query sentence in a pre-stored query sentence dictionary, the query sentence dictionary being established based on query sentences having a target category of demand and the network data corresponding to each of the query sentences having the target category of demand; identify the target category of demand of the user's query sentence using a trained demand identification model based on the network data corresponding to the user's query sentence; count the access data corresponding to the search result obtained by searching the user's query sentence based on categories of demand, to obtain access data distribution of the user's query sentence on each of the categories of demand; and determine a demand intensity of the target category of demand of the user's query sentence based on an identification result of the target category of demand of the user's query sentence and the access data distribution of the user's query sentence on the each of the categories of demand.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for identifying a demand, the method comprising:
   acquiring a user's query sentence and access data corresponding to a search result obtained by searching the user's query sentence;
   querying network data corresponding to the user's query sentence in a pre-stored query sentence dictionary, the query sentence dictionary being established based on query sentences having a target category of demand and the network data corresponding to each of the query sentences having the target category of demand;
   identifying the target category of demand of the user's query sentence using a trained demand identification model based on the network data corresponding to the user's query sentence;
   counting the access data corresponding to the search result obtained by searching the user's query sentence based on categories of demand, to obtain access data distribution of the user's query sentence on each of the categories of demand; and
   determining a demand intensity of the target category of demand of the user's query sentence based on an identification result of the target category of demand of the user's query sentence and the access data distribution of the user's query sentence on the each of the categories of demand.

2. The method according to claim 1, wherein the identifying the target category of demand of the user's query sentence using a trained demand identification model based on the network data corresponding to the user's query sentence comprises:
   extracting a characteristic from the network data corresponding to the user's query sentence; and
   inputting the extracted characteristic into a trained demand identification model to identify the target category of demand.

3. The method according to claim 1, the method further comprising:
   establishing the query sentence dictionary based on historical query sentences having the target category of demand and the network data corresponding to the historical query sentences having the target category of demand, comprising:
   acquiring a user click log and a page display log corresponding to each of the historical query sentences having the target category of demand;
   establishing entries of the historical query sentences, performing statistical analysis on user click data and page display data based on the user click log and the page display log, and associating, in the entries of the historical query sentences, a statistical analysis result of the user click data and the page display data with the each of the query sentences; and
   determining site data relating to the each of the historical query sentences having the target category of demand based on the user click log and the page display log, and associating, in the entries of the historical query sentences, the site data with the each of the historical query sentences.

4. The method according to claim 1, the method further comprising training the demand identification model based on marked sample query sentences, comprising:
querying the network data corresponding to each of the sample query sentences in the pre-stored query sentence dictionary; and
predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

5. The method according to claim 1, wherein the target category of demand comprises an image category of demand.

6. An apparatus for identifying a demand, comprising:
at least one processor; and
a memory storing instructions, the instructions when executed by the at least one processor, cause the at least one processor to perform operations, the operations comprising:
acquiring a user's query sentence and access data corresponding to a search result obtained by searching the user's query sentence;
querying network data corresponding to the user's query sentence in a pre-stored query sentence dictionary, the query sentence dictionary being established based on query sentences having a target category of demand and the network data corresponding to each of the query sentences having the target category of demand;
identifying the target category of demand of the user's query sentence using a trained demand identification model based on the network data corresponding to the user's query sentence;
counting the access data corresponding to the search result obtained by searching the user's query sentence based on categories of demand, to obtain access data distribution of the user's query sentence on each of the categories of demand; and
determining a demand intensity of the target category of demand of the user's query sentence based on an identification result of the target category of demand of the user's query sentence and the access data distribution of the user's query sentence on the each of the categories of demand.

7. The apparatus according to claim 6, wherein the identifying the target category of demand of the user's query sentence using a trained demand identification model based on the network data corresponding to the user's query sentence comprises:
extracting a characteristic from the network data corresponding to the user's query sentence; and
inputting the extracted characteristic into a trained demand identification model to identify the target category of demand.

8. The apparatus according to claim 6, further comprising:
establishing the query sentence dictionary based on historical query sentences having the target category of demand and the network data corresponding to the historical query sentences having the target category of demand, comprising:
acquiring a user click log and a page display log corresponding to each of the historical query sentences having the target category of demand;
establishing entries of the historical query sentences, performing statistical analysis on user click data and page display data based on the user click log and the page display log, and associating, in the entries of the historical query sentences, a statistical analysis result of the user click data and the page display data with the each of the query sentences; and
determining site data relating to the each of the historical query sentences having the target category of demand based on the user click log and the page display log, and associating, in the entries of the historical query sentences, the site data with the each of the historical query sentences.

9. The apparatus according to claim 6, the operations further comprising training the demand identification model based on marked sample query sentences, comprising:
querying the network data corresponding to each of the sample query sentences in the pre-stored query sentence dictionary; and
predicting the network data corresponding to the each of sample query sentences according to the demand identification model, and adjusting a parameter of the demand identification model based on a difference between a prediction result and a marked result, to enable the difference between the prediction result and the marked result to meet a preset convergence condition.

10. The apparatus according to claim 6, wherein the target category of demand comprises an image category of demand.

11. A non-transitory computer-readable storage medium storing a computer program, the computer program when executed by one or more processors, causes the one or more processors to perform operations, the operations comprising:
acquiring a user's query sentence and access data corresponding to a search result obtained by searching the user's query sentence;
querying network data corresponding to the user's query sentence in a pre-stored query sentence dictionary, the query sentence dictionary being established based on query sentences having a target category of demand and the network data corresponding to each of the query sentences having the target category of demand;
identifying the target category of demand of the user's query sentence using a trained demand identification model based on the network data corresponding to the user's query sentence;
counting the access data corresponding to the search result obtained by searching the user's query sentence based on categories of demand, to obtain access data distribution of the user's query sentence on each of the categories of demand; and
determining a demand intensity of the target category of demand of the user's query sentence based on an identification result of the target category of demand of the user's query sentence and the access data distribution of the user's query sentence on the each of the categories of demand.

* * * * *